4 Sheets—Sheet 1.
G. COLES, J. A. JAQUES & J. A. FANSHAWE.
HOSE AND MACHINE FOR MAKING HOSE.
No. 83,132.                                    Patented Oct. 20, 1868.
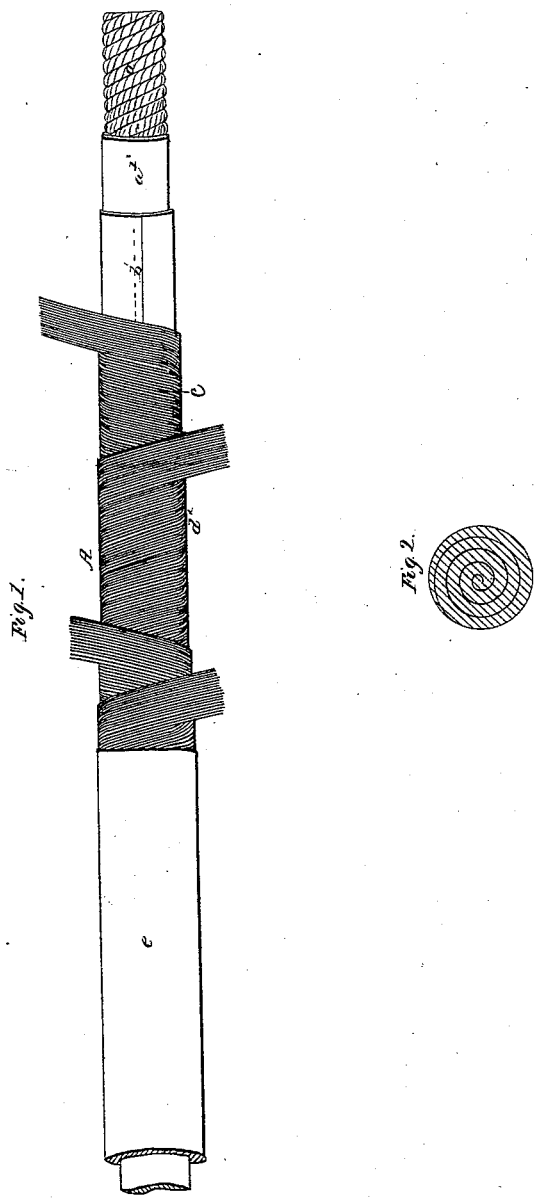

4 Sheets—Sheet 2.
G. COLES, J. A. JAQUES & J. A. FANSHAWE.
HOSE AND MACHINE FOR MAKING HOSE.
No. 83,132. Patented Oct. 20, 1868.
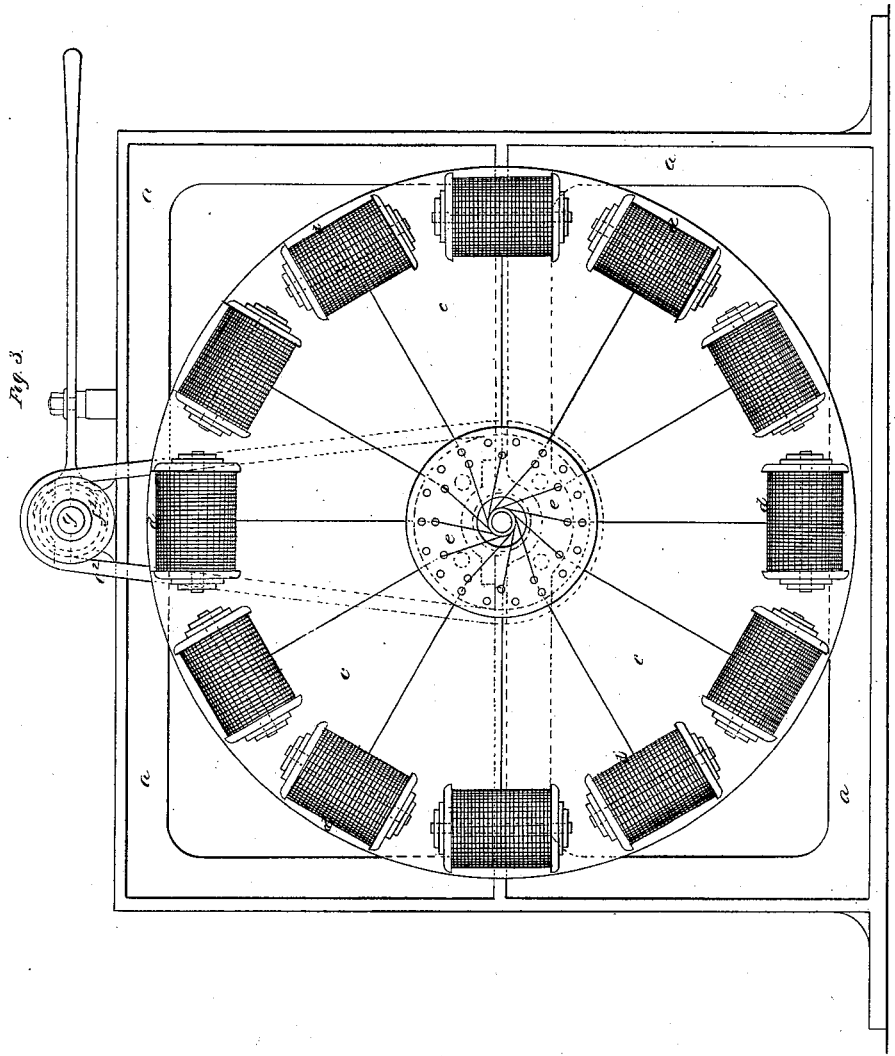

4 Sheets—Sheet 3.
G. COLES, J. A. JAQUES & J. A. FANSHAWE.
HOSE AND MACHINE FOR MAKING HOSE.
No. 83,132. Patented Oct. 20, 1868.
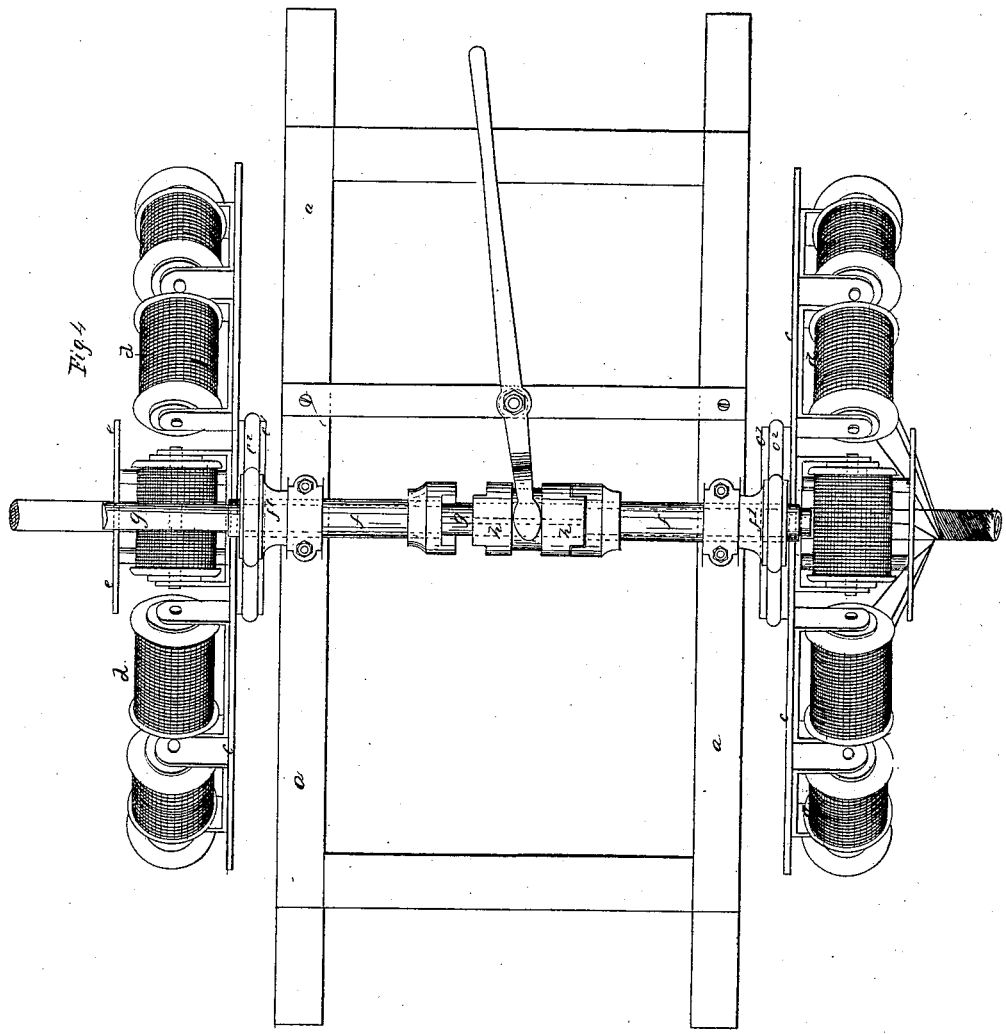

4 Sheets—Sheet 4.
G. COLES, J. A. JAQUES & J. A. FANSHAWE.
HOSE AND MACHINE FOR MAKING HOSE.
No. 83,132. Patented Oct. 20, 1868.
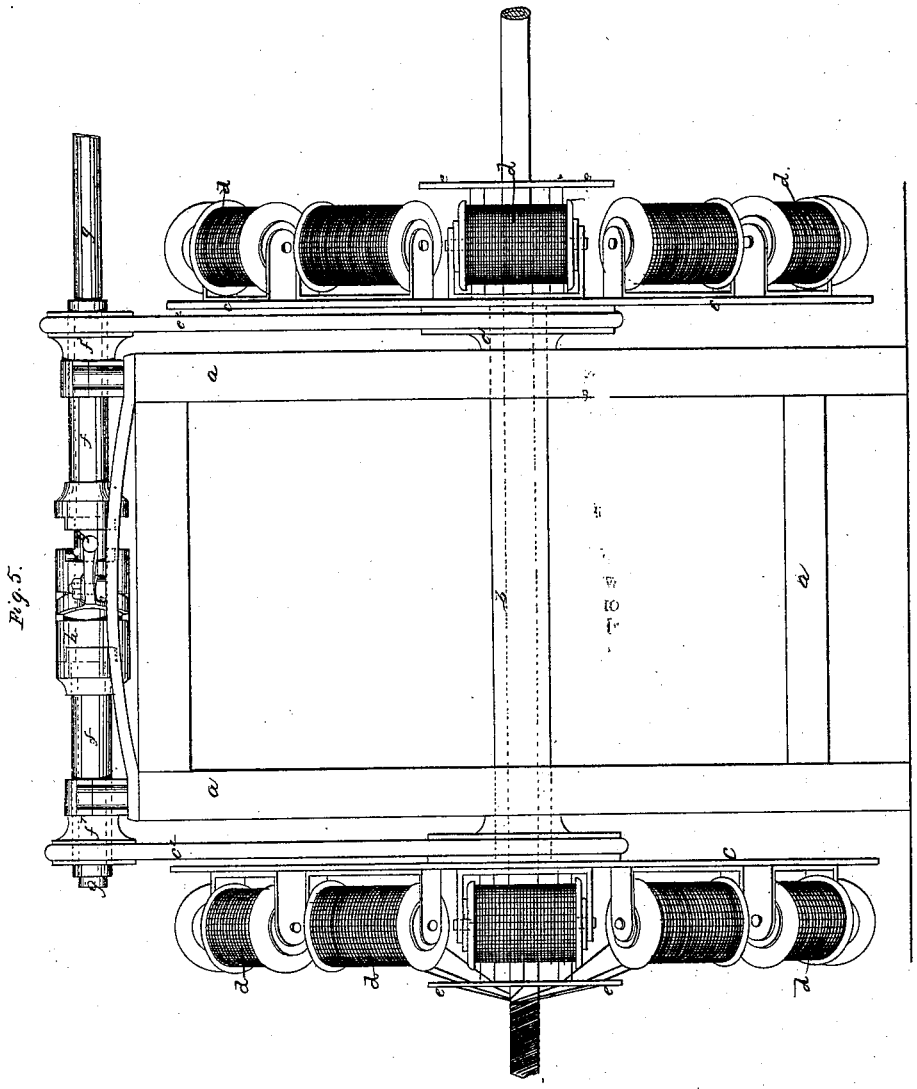

United States Patent Office.

GEORGE COLES, OF LONDON, AND JAMES ARCHIBALD JACQUES AND JOHN AMERICUS FANSHAWE, OF TOTTENHAM, ENGLAND.

*Letters Patent No. 83,132, dated October 20, 1868; patented in England, August 17, 1864.*

IMPROVEMENT IN HOSE, AND MACHINE FOR MAKING HOSE.

*The Schedule referred to in these Letters Patent and making part of the same.*

*To all whom it may concern:*

Be it known that we, GEORGE COLES, of Gresham street West, in the city of London, county of Middlesex, England, and JAMES ARCHIBALD JACQUES, and JOHN AMERICUS FANSHAWE, both of Tottenham, in the county of Middlesex, England, have invented certain new and useful Improvements in the Manufacture of Hose or Tubular Articles; and we do hereby declare that the following is a full, clear, and exact description thereof, which will enable others skilled in the art to make and use the same, reference being had to the accompanying drawings, forming a part of this specification.

Our invention relates to improvements in the manufacture of flexible hose for fire-engines and other similar purposes.

It consists, first, in preparing a core on which to form the hose, by covering a rope of suitable size with sheet-rubber, gutta-percha, or other analogous or suitable gum, so as to produce a smooth surface, which must be well lubricated by being covered with French chalk or other substance which will facilitate the withdrawal of the core after the tube has been formed thereon.

The said core may be made flexible, if the tube to be formed thereon be of any considerable length. It is not, however, essential that it be flexible, and it may be made of iron or other metal.

We then surround the said core with a thin coating of sheet-rubber. The covered core is then placed in a gimping or plaiting-machine, and a covering of cotton or other similar material wound around it, which is then coated with a thick solution of paste of caoutchouc, or other suitable gum, together with the sulphur and other necessary chemical agents usually employed for vulcanizing India-rubber goods, which operation is repeated until a sufficient degree of strength is obtained, when the whole is covered with a thin sheet of rubber, and subjected to the vulcanizing process.

Our invention further consists in the construction and arrangement of the improved gimping or plaiting-machine, which we use for covering the said core, as will be more fully described on reference to the accompanying drawings, wherein—

Figure 1 represents a tube being formed on a flexible core;

Figure 2 represents a section of the same;

Figure 3 represents an end elevation of our improved machine;

Figure 4 represents a top view of the same; and

Figure 5 represents a front elevation of the same.

Similar letters of reference indicate corresponding parts.

A represents a tube being made on one of these flexible cores, $a^*$, which consists of an ordinary rope. This is covered with a piece of sheet-rubber, $a'^*$.

The core having been formed in this manner, is then to be surrounded throughout its length with a thin strip or strips of sheet-rubber, or other suitable gum, as seen at $b^*$. This rubber may either be laid helically round the core, in the form of narrow sheets or tapes, as shown at fig. 1, or it may be formed of one piece, with a seam running longitudinally along and parallel with the core, as indicated by dots in the same figure.

The covered cord $a^*$ is then placed in a gimping or plaiting-machine, such as that hereafter described, and a covering of cotton or other fibre, consisting either of a number of single threads, laid in a helical direction round the core, but parallel and contiguous to each other, as at $c^*$, or a tape or narrow fabric of suitable width, according to the diameter of the tube to be made, may be laid helically round the core.

This cotton or other covering, in whatever way it may be produced, is then coated with a thick solution or paste of caoutchouc, or other suitable gum, together with the sulphur and other chemical agents usually employed in vulcanizing India-rubber goods.

The core or pipe is again surrounded with a second covering, consisting of a series of cotton or other threads or tapes, which, however, must be laid in the opposite direction to the former threads or tapes, as seen at $d^*$.

This second covering of threads or tapes is also coated or payed over with the caoutchouc paste or solution, and a third and fourth and more coverings of cotton, if required, may be wound round the core or tube, each cotton covering being well coated with the rubber solution before the next cotton covering is wound on, and each cotton covering is wound on in the opposite direction to that preceding it.

When a sufficient number of plies have been wound on, a band of sheet-rubber, $e$, or other suitable gum, is then laid over all, and is properly secured at the edges by a solution of rubber.

When the required number of plies have been completed, the flexible or other core may be withdrawn, and the tubular or hollow article may then be subjected to the well-known vulcanizing process, which will finish the article.

The flexible core may be formed either of a common hempen rope, covered, as already explained, with a sheet of India rubber, or it may be formed of a suitable breadth of woven fabric, rolled up in the manner shown in the sectional view, fig. 2, and covered with sheet-rubber, so as to present a smooth surface.

The frame-work of the machine is seen at $a\ a$.

On the ends of a hollow shaft, $b$, are mounted loosely the two disks or wheels, $c\ c$, on which are mounted, in suitable bearings, a series of bobbins, $d\ d$, provided with a supply of cotton or other yarn or threads, which pass separately from the bobbins through holes or eyes in a circular plate, $e$, mounted on stud-pins, fixed in the face of the disk or wheel c, so as to rotate therewith.

At the back of each disk or wheel c is a pulley, $c^1$, around which passes a driving-band, $c^2$, from another pulley, $f'$, on the sleeve shafts $f$, through which passes the main driving-shaft $g$, which may be actuated in any convenient manner from any suitable prime-mover.

The driving-shaft $g$ carries a double-acting sliding clutch, $h$, which is capable of being thrown into gear with either of the clutches on the inner ends of either of the sleeve-shafts $f f$, so that either of the disks or wheels $c c$, with their bobbins, may be actuated and made to lay the threads from the bobbins round the core $h$, on which the tube is to be formed.

This core $h$ passes through the hollow shaft $b$, and the central holes in the disks $c c$ and circular plates $e e$. It will, therefore, be understood that if the core $h$ be drawn through the tubular shaft $b$ and disks $c$, and one of these latter be set in rotary motion by throwing the clutch $h$, on the main driving-shaft, into gear with the clutch on the end of the sleeve-shaft $f$, corresponding to the disk and set of bobbins it is desired to rotate, then the threads from the bobbins $d d$ will be laid helically round the core, from end to end thereof.

When the entire length of the core has been covered in this manner, it must be drawn back again through the disks and hollow shafts $b$, and the other disk must be thrown into gear with the driving-clutch, when the threads from the bobbins of the second disk will be laid helically round the core in the opposite direction to those of the first layer of threads. These plies of threads may be repeated as often as may be desired, according to the strength of the tube required.

We would here observe that by constructing flexible tubes or hose in the manner above set forth, a considerable amount of flexibility is obtained without the risk of breaking the non-elastic strands, as is sometimes the case when the non-elastic strands run longitudinally from end to end of the tube, as when woven fabrics are employed.

Some articles may be formed on an iron core, and when this is the case, they may be vulcanized with the core in them, so as to prevent them from getting out of shape.

It should be observed that under the words "caoutchouc, gutta-percha, and other analogous or suitable gums," are included all the compounds of rubber or gutta-percha which may be found suitable for the purposes of our invention, as well as other gums, such as valata, possessing the requisite properties of flexibility and elasticity.

Having thus described our invention,

What we claim as new, and desire to secure by Letters Patent, is—

1. As a new article of manufacture, flexible hose, when constructed substantially as and for the purpose specified.

2. The apparatus, constructed as described, whereby alternate layers or plies of yarn or thread are laid helically round the core in opposite directions, as herein set forth and shown.

GEO. COLES. [L. S.]
JAS. A. JACQUES. [L. S.]
JOHN A. FANSHAWE. [L. S.]

Witnesses:
FRED. WALKDEN, 66 *Chancery Lane, London.*
G. W. WESTLEY, 24 *Royal Exchange, London.*